R. HUFF.
TAIL LAMP FOR MOTOR VEHICLES.
APPLICATION FILED MAY 17, 1910.
1,053,995.
Patented Feb. 25, 1913.
2 SHEETS—SHEET 1.
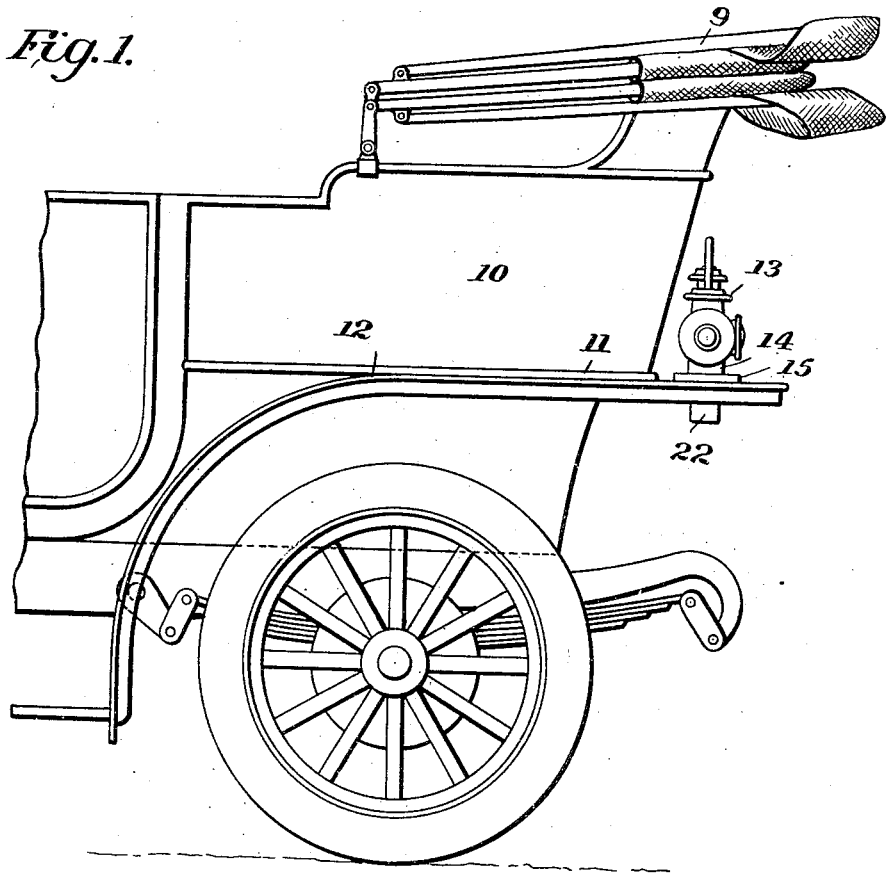
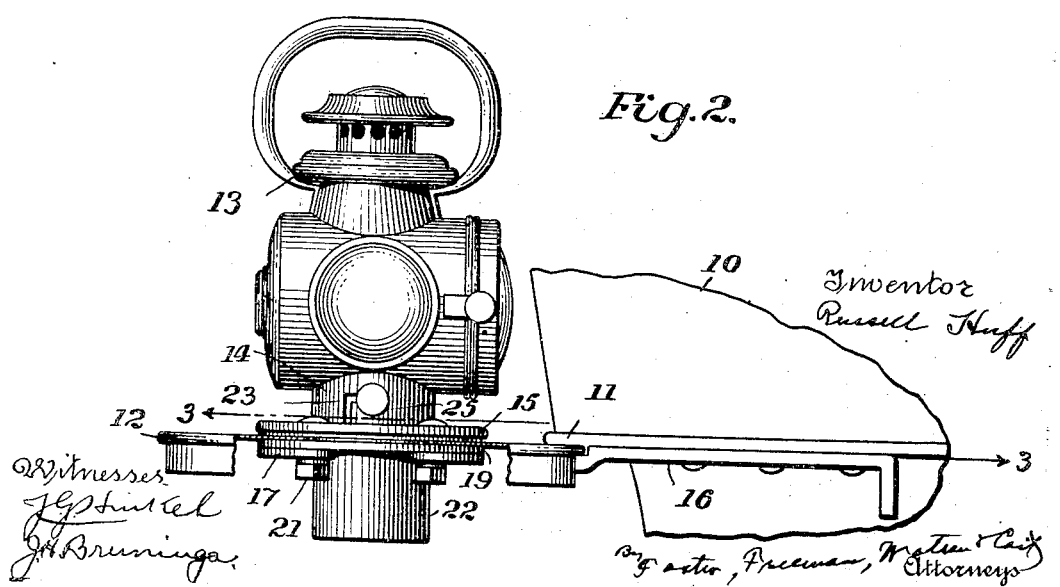

R. HUFF.
TAIL LAMP FOR MOTOR VEHICLES.
APPLICATION FILED MAY 17, 1910.
1,053,995.
Patented Feb. 25, 1913.
2 SHEETS—SHEET 2.
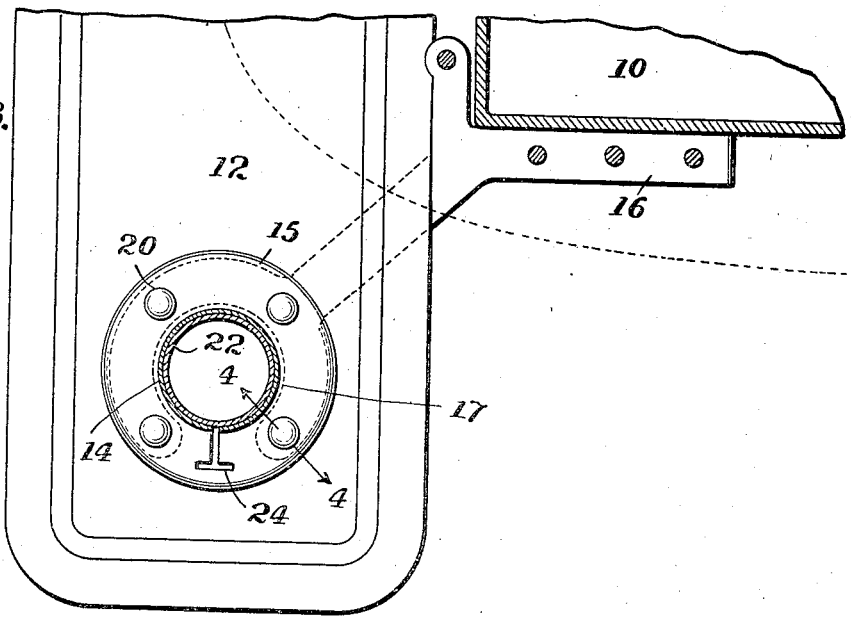
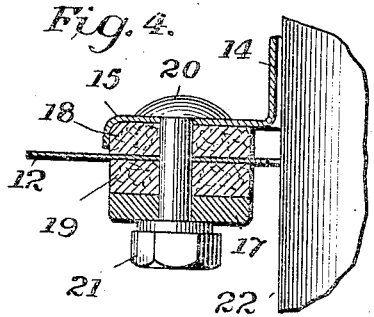
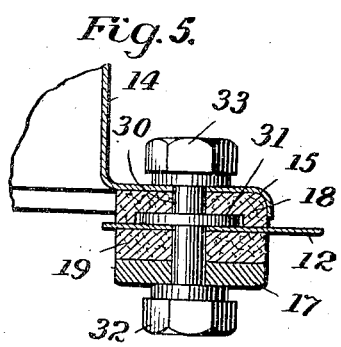
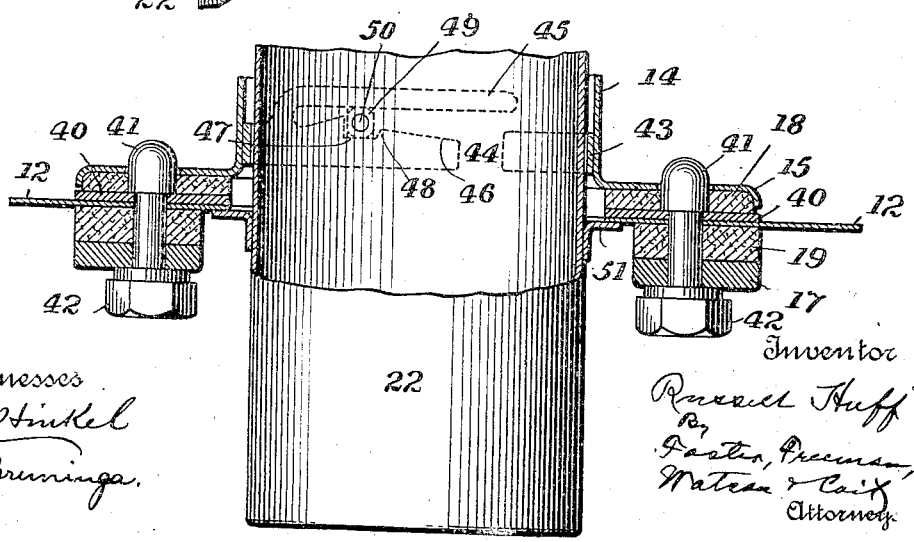

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

TAIL-LAMP FOR MOTOR-VEHICLES.

1,053,995.  Specification of Letters Patent.  Patented Feb. 25, 1913.

Application filed May 17, 1910. Serial No. 561,906.

*To all whom it may concern:*

Be it known that I, RUSSELL HUFF, a citizen of the United States, and resident of Detroit, county of Wayne, State of Michigan, have invented certain new and useful Improvements in Tail-Lamps for Motor-Vehicles, of which the following is a specification.

This invention relates to motor vehicles, and more particularly to the tail lamp and its means of attachment to the vehicle.

One of the objects of this invention is to attach the lamp in a convenient position on the vehicle and in such a manner that the vibration will be reduced to a minimum.

Another object is to provide a means of attachment whereby the lamp may be easily removed from and placed in operative position.

Further objects will appear from the detail description.

The invention will be described in connection with the accompanying drawings, in which—

Figure 1 is a partial side elevation of a motor vehicle showing the lamp attached thereto; Fig. 2 is the detail rear elevation; Fig. 3 is a section on the line 3—3, Fig. 2; Fig. 4 is a section on the line 4—4, Fig. 3; Fig. 5 is a similar section showing another method of attachment; Fig. 6 is a longitudinal section showing another form of this invention.

Referring to the drawings, and more particularly to Figs. 1 to 4 inclusive, 10 designates a motor vehicle body which is provided with an offset portion 11, a mud guard 12, and a top 9. A tail lamp 13 is mounted upon the mud guard and is provided with a body or casing 14 having a flange 15. A bracket 16 is secured to the vehicle body underneath the offset portion as shown in Figs. 1 to 3 inclusive, and is provided with a ring or fork shaped portion 17 which extends underneath the mud guard. A pair of packing rings 18 and 19 are positioned between the mud guard 12, and the flange 15 and the ring shaped portion 17, and suitable fastening bolts 20 extend through these portions and are provided with nuts 21 so as to securely clamp the flange, the mud guard, and the bracket together. The lamp is provided with a fuel reservoir 22 having the usual wick adjusting member 23, and the mud guard is provided with an aperture through which the reservoir extends. The mud guard, flange 15, and packing are also provided with a T-shaped recess 24 for the adjusting member and its shank. The lamp casing and reservoir are provided with a suitable coöperating lug and slot forming a bayonet joint so as to detachably secure the reservoir in position. Such a joint is shown in Fig. 6, and will be described in detail hereinafter, but any well known form of joint may be used. The casing 14 is further provided with a slot 25 for the shank of the member 23. This slot has an offset portion to permit the reservoir to be partially rotated when locked. By means of this construction, the reservoir is arranged to be inserted and removed without removing the lamp from the vehicle.

It will be seen that the lamp is mounted in the most convenient position, and that it is rigidly connected to the body by means of the bracket so that the lamp is braced, and thus the vibration is reduced to a minimum. The fuel reservoir and the burner connected therewith can be easily removed from the lamp body without necessitating the removal of the lamp as a whole from the vehicle body.

In Fig. 1, the top is shown lowered and in this position will be above the mud guard. Now the lamp must be mounted low enough as not to burn the top, on the other hand, it must be mounted high enough so as to be out of the reach of mud and water, thrown up from the road. Both of these results are secured by mounting the lamp on the mud guard in the manner shown, and in addition the lamp will be located in the most convenient position.

In Fig. 5, the fastening bolt is provided with a shank 30 and collar 31. The mud guard and bracket are secured together by means of a nut 32, and the shank is provided with a nut 33, so that the lamp can be removed without disturbing the joint between the mud guard and the bracket.

In Fig. 6, the fastening bolt is provided with a head 41 preferably circular in cross section, and the nut 42 is arranged to clamp the mud guard to the bracket 17. Where the head 41 is thus reduced in size, a metal plate or washer 40 is preferably interposed between the mud guard and head. The flange 15 in this case is provided with holes of the same diameter as the head, so that the heads act as dowel pins to position the lamp on the mud guard. The lamp body or casing 14 has secured to it a ring 43 provided with a recess 44 and a yielding portion 45 which extends over the recess. The ring is also provided with an inclined portion 46 and a recessed portion 47, provided with a shoulder 48. A block 49 is mounted upon a pin 50 on the reservoir, and the reservoir has also secured to it a flanged ring 51. After the lamp has been placed in position on the heads 41, the reservoir is placed in position so that the block 49 passes through the recess 44 in the ring 43. The reservoir is then rotated so that the block will snap into position in the recess 47, the spring finger 45 yielding so as to allow this action to take place. The inclined portion 46 will form a cam which will clamp the flanged ring 51 against the mud guard, as shown in Fig. 6, so as to securely clamp the parts together. The reservoir will be yieldingly maintained in position by means of the shoulder 48 against which the block 49 abuts, however, by rotating the reservoir in the opposite direction, the block will be released so that the reservoir and lamp can be removed.

It is obvious that various changes may be made in the details of construction without departing from this invention, and it is therefore, to be understood that this invention is not to be limited to the specific construction shown and described.

Having thus described the invention, what is claimed is:

1. The combination with a motor vehicle body and a mud guard secured thereto and having an opening therein, of a lamp mounted on said guard and having a portion extending below said guard and through said opening.

2. The combination with a motor vehicle body, its mud guard having an opening therein, and a bracket securing the guard to the body and attached to the guard adjacent said opening, of a lamp mounted on said guard at the opening and having a portion extending below the guard and through said opening.

3. The combination with a motor vehicle body and a mud guard therefor, of a lamp having a flange secured to said guard, a bracket secured to said body and supporting said lamp and said mud guard, a fuel reservoir for said lamp, and means for detachably securing said reservoir in position.

4. The combination with a motor vehicle body and a mud guard therefor, of a lamp mounted on said guard, a bracket secured to said body and to said guard at the point of attachment of said lamp, and a fuel reservoir for said lamp, said guard being provided with an opening for said reservoir.

5. The combination with a motor vehicle body and a mud guard therefor, of a lamp mounted on said guard, a bracket secured to said body and to said guard at the point of attachment of said lamp, a fuel reservoir for said lamp, said guard being provided with an opening for said reservoir, and means for latching said reservoir in position, whereby said reservoir may be removed and replaced through said opening.

6. The combination with a motor vehicle body and a mud guard therefor, of a lamp provided with a flange resting on said guard, a bracket secured to said body and provided with a portion extending underneath the guard and flange, and fastenings passing through said flange, guard and into the said bracket portion.

7. The combination with a motor vehicle body and a mud guard therefor, of a lamp provided with a flange resting on said guard, a bracket secured to said body and provided with a portion extending underneath the guard and flange, fastenings passing through said flange, guard and into said bracket portion, and packing rings between said guard and said flange and bracket portion.

8. The combination with a motor vehicle body having an offset portion and a mud guard for said body, of a lamp mounted on said guard, a bracket secured to said body underneath said offset portion and extending across said guard, and fastenings for securing said lamp to said bracket.

9. The combination with a motor vehicle body and a mud guard therefor provided with an opening, of a lamp mounted on the upper side of said guard and having a detachable portion extending through said opening.

10. The combination with a motor vehicle body, of a mud guard therefor, provided with an opening, and a lamp having a removable fuel reservoir extending through the opening, the body of the lamp being above and the fuel reservoir below the guard.

11. The combination with a motor vehicle body and a mud guard therefor, of a lamp mounted on said guard, a bracket secured to said body and to said mud guard at the point of attachment of said lamp, and means for detachably securing said lamp to said guard and bracket.

12. The combination with a motor vehicle body and a mud guard therefor, of a lamp mounted on said guard, a bracket secured to said body and extending across said guard, fastenings extending through said guard and bracket and provided with shanks extending through a part of said lamp, and nuts on said shanks for detachably securing said lamp in position.

13. The combination with a motor vehicle body and a mud guard therefor, of a lamp on said guard having its fuel reservoir extending below the guard and its wick adjusting member above said guard.

14. The combination with a motor vehicle body and a mud guard therefor, of a lamp mounted on said guard and comprising a fuel reservoir arranged below the guard and removable from the lamp and a wick adjusting member arranged above said guard.

In testimony whereof I affix my signature in presence of two witnesses.

RUSSELL HUFF.

Witnesses:
ALLEN LOOMIS,
R. M. HIDEY.